United States Patent [19]
Jones

[11] Patent Number: 4,773,894
[45] Date of Patent: Sep. 27, 1988

[54] A-SHAPED FRAME AND PULLEY

[76] Inventor: Donald J. Jones, 10 Gertrude Pl., Wappingers Falls, N.Y. 12590

[21] Appl. No.: 93,798

[22] Filed: Sep. 4, 1987

[51] Int. Cl.⁴ ............................................. F16H 55/36
[52] U.S. Cl. .................................................. 474/198
[58] Field of Search ........................ 474/198, 166, 54; 254/374; 29/121.5; 198/842

[56] References Cited

U.S. PATENT DOCUMENTS

| | | | |
|---|---|---|---|
| 348,285 | 8/1886 | Ingram | 474/198 X |
| 697,354 | 4/1902 | McKeen | 474/198 X |
| 1,410,549 | 3/1922 | Busskohl | 474/198 |
| 2,095,409 | 10/1937 | Deluchi et al. | 254/374 X |
| 2,681,140 | 6/1954 | Mayner | 242/47.04 |
| 3,118,408 | 1/1964 | Knapp | 114/267 |
| 3,301,383 | 1/1967 | Doyer | 198/824 |
| 3,807,982 | 4/1974 | Claassen et al. | 198/785 X |
| 4,520,616 | 6/1985 | Stewart et al. | 56/9 |

Primary Examiner—Jerome W. Massie, IV
Assistant Examiner—Matthew Smith

[57] ABSTRACT

This invention relates to a releasably secured pulley frame and a rotor shaped to prevent entanglements, thereby allowing undisturbed force to be exerted on an object being pulled to or from a remote site. Embodiments of the invention may be constructed in a variety of sizes from standard size materials that are commercially available, such as aluminum, steel, plastics or wood.

3 Claims, 3 Drawing Sheets

A-SHAPED FRAME AND PULLEY

BACKGROUND OF THE INVENTION

Pulleys have been in use for centuries to reverse a pulling force, but their designs have not kept pace with the availability of new materials or methods of manufacture. Currently available pulleys cannot be used effectively when the pulling rope, cable, chain, knots, splices, connector joints, or foreign matter such as accumulated aquatic weeds or other vegetation become tangled with the pulley. Entanglements are caused either by the pulley not pointing midway between the pulling force and the object being pulled, or by what is being pulled through the pulley being larger than the space provided within the pulley.

Currently available pulleys are designed for specific rope or chain sizes that allow minimum space for knots or obstructions to pass through the pulley; the pulling rope or chain may tangle with the frame when tension is not continuously maintained; and the excessive weight of heavy duty pulleys makes their use impractical in many aquatic applications.

SUMMARY OF THE INVENTION

The main purpose of the invention is to provide a means for exerting undisturbed force on an object being pulled to or from a remote site. Such a device is commonly referred to as a force reversing pulley.

An equally important purpose is to provide a means for attaching or removing the pulley at any point along the length of the pulling rope or chain.

A third purpose is to provide flotation of the pulley in water.

Another purpose is to provide a method for embodiments of the invention in variety of sizes by using a standard size materials that are commercially available, such as aluminum, steel, plastics or wood.

An additional purpose is to create minimum waste or scrap with each embodiment of the invention.

This invention comprises an A-shaped frame and a square wheel rotor. The A-shaped frame causes the pulley to align itself when force is applied to a pulling rope or chain, and provides open space for a pulling rope or chain to pass through the pulley that is from ten to one thousand times larger than the pulling rope or chain. Shape of the square wheel rotor forces it to rotate when an obstacle on the rope or chain comes in contact with the rotor.

The A-shaped frame comprises two similar halves. Rotating the top frame half counter-clockwise separates the two frame halves for inserting or removing the midsection of a pulling rope or chain from the pulley.

The method of constructing embodiments of this invention create enclosed air chambers, within the two frame halves and the square wheel rotor, that provide bouyancy of the pulley in water.

BRIEF DESCRIPTION OF THE DRAWINGS

The accompanying drawings illustrate each feature of the invention wherein the same characters refer to the same or similar parts throughout the different views, in which.

DETAILED DESCRIPTION

Figure 1:
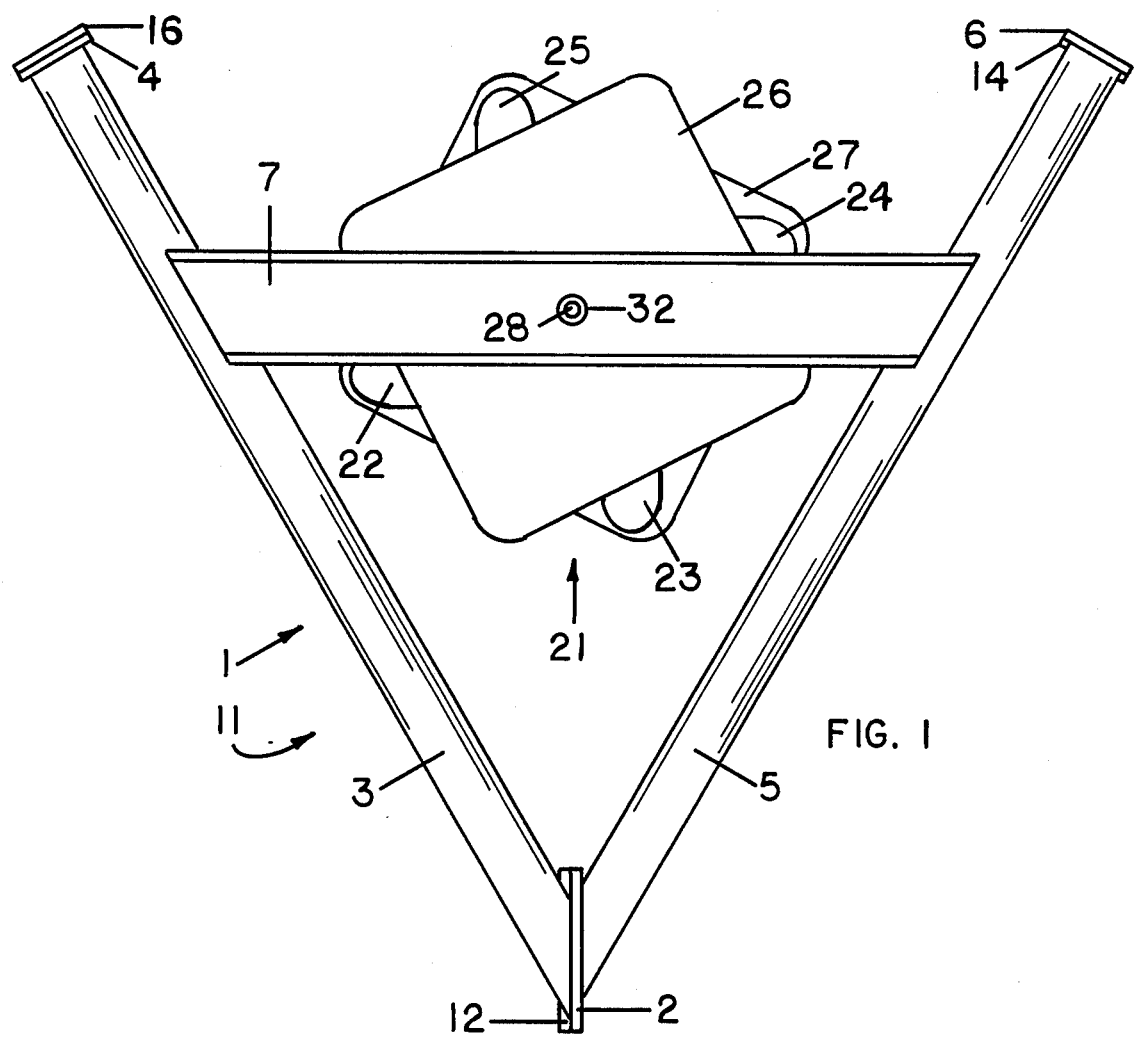
FIG. 1 is a top view of an A-framed square wheel pulley embodying this invention.

Referring now to the accompanying drawings, FIG. 1 shows the top view of an A-framed square wheel pulley. The drawing includes the top frame half 1, parts of the bottom frame half 11, a rotor 21, and the rotor axle 28 that revolves in the top bushing 32.

The two frame halves 1 and 11 are similar, except that the bottom frame half 11 is reversed in this view. Three vertical connectors 12, 14 and 16 are the only parts of the lower frame half 11 that are visible in this view.

The front vertical connector 2 is joined with two tubular members 3 and 5 to form a horizontal V-shape. The other ends of both tubular members 3 and 5 are joined with their respective left and right vertical connectors 4 and 6. A crossbar 7 is attached to the top edge of both tubular members 3 and 5 to form a horizontal A-shape and also provide rotational support for the rotor axle 28 that is shown within the top bushing 32. The axle support opening is located centrally between the extremities of the A-shaped frame. When buoyancy of the frame is required, all end joints of the tubular members are made with airtight welds.

The three vertical connectors 2, 4 and 6 extend downward from the tubular members 3 and 5 and are provided with holes for joining together the top and bottom frame halves 1 and 11.

The top endplate 26 and the bottom endplate 27 of the rotor 21 can be seen attached to the rotor support members 22, 23, 24 and 25.

Structural stability of the frame is provided by the triangular shape within the frame halves 1 and 11, and the positioning of each pair of vertical connectors that align the two frame halves.

Figure 2:
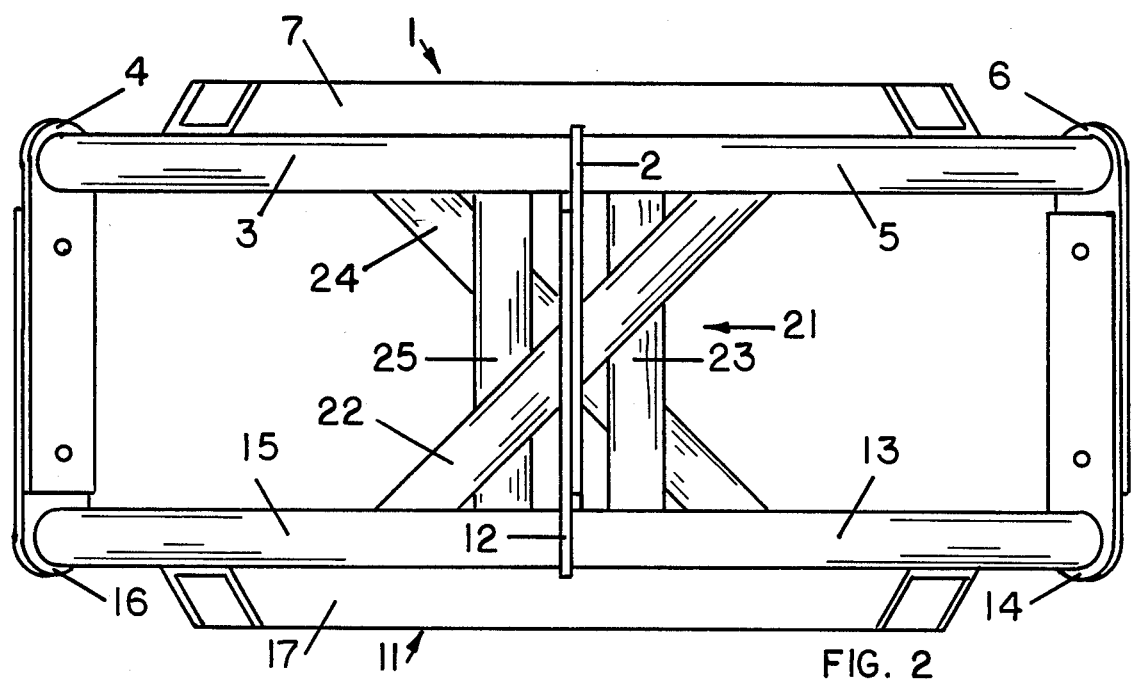
FIG. 2 is a front view of the pulley.

FIG. 2 shows the front view of the pulley and the shape of its rotor 21. The rotor 21 is rotatably mounted between the top 7 and bottom 17 crossbars.

Rotor support members 22, 23, 24 and 25 extend above the lower edge of the top frame tubular members 3 and 5 and below the upper edge of the bottom frame tubular members 15 and 13 to prevent entanglement of a pulling rope with either end of the rotor 21.

Spaces within the pulley, to allow passage of a pulling rope or chain, are determined by the proportional sizes of the rotor and the pulley frame. Height of the rotor determines the length of the frame vertical connectors which in turn determines the vertical space that is provided through the pulley for a pulling rope. Length of the frame tubular members 3, 5, 13 and 15 determines the horizontal space that is provided through the pulley for a pulling rope. The vertical and horizontal spaces are independent of each other. Total space through the pulley can be from ten to one thousand times larger than the size of the pulling rope, so that knots, entanglements and debris can pass freely through the pulley.

Figure 3:
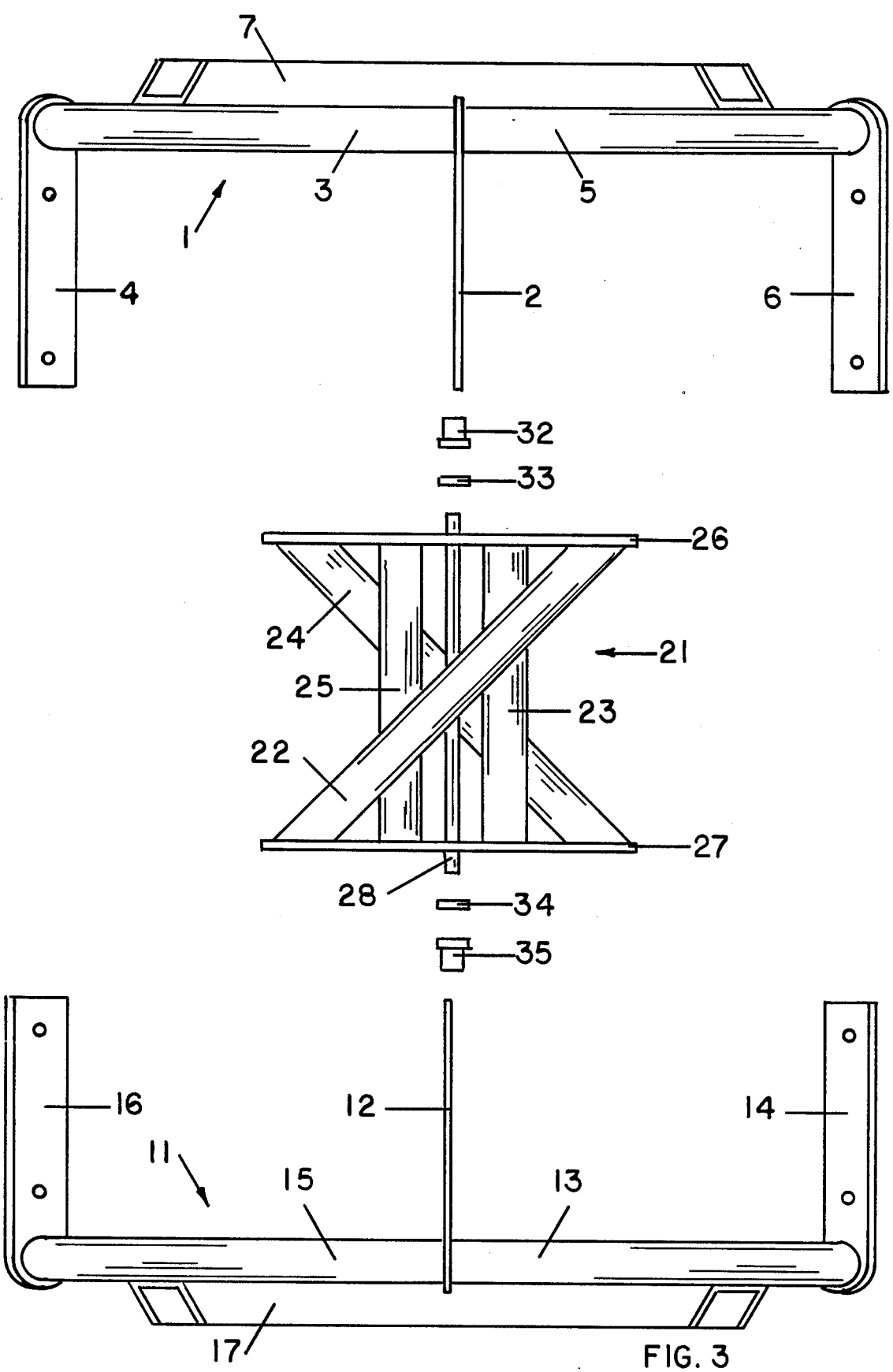
FIG. 3 is an exploded front view illustrating assembly of the square wheel within two halves of the A-shaped frame, with bushings and thrust bearings on the axle of the square wheel.

FIG. 3 shows an exploded front view that illustrates how the pulley is assembled by a user from its several parts; the top frame half 1, bottom frame half 11, two bushings 32 and 35, two thrust bearings 33 and 34, and a rotor 21.

The rotor 21 comprises two square endplates 26 and 27 that are joined with an axle 28 that passes through a centrally located hole in each endplate 26 and 27. The endplates 26 and 27 are rotationally offset from each other to enable each of four support members 22, 23, 24 and 25 to be joined to diametrically opposed corners of the top 26 and bottom 27 endplates, forming an angle of from zero to seventy degrees with the axle 28 so that each member provides structural support to its adjacent members. Each of the support members 22, 23, 24 and 25 are joined at the points of contact with two adjoining support members. When buoyancy of the rotor is required, all end joints of the support members are made with airtight welds.

Figure 4:
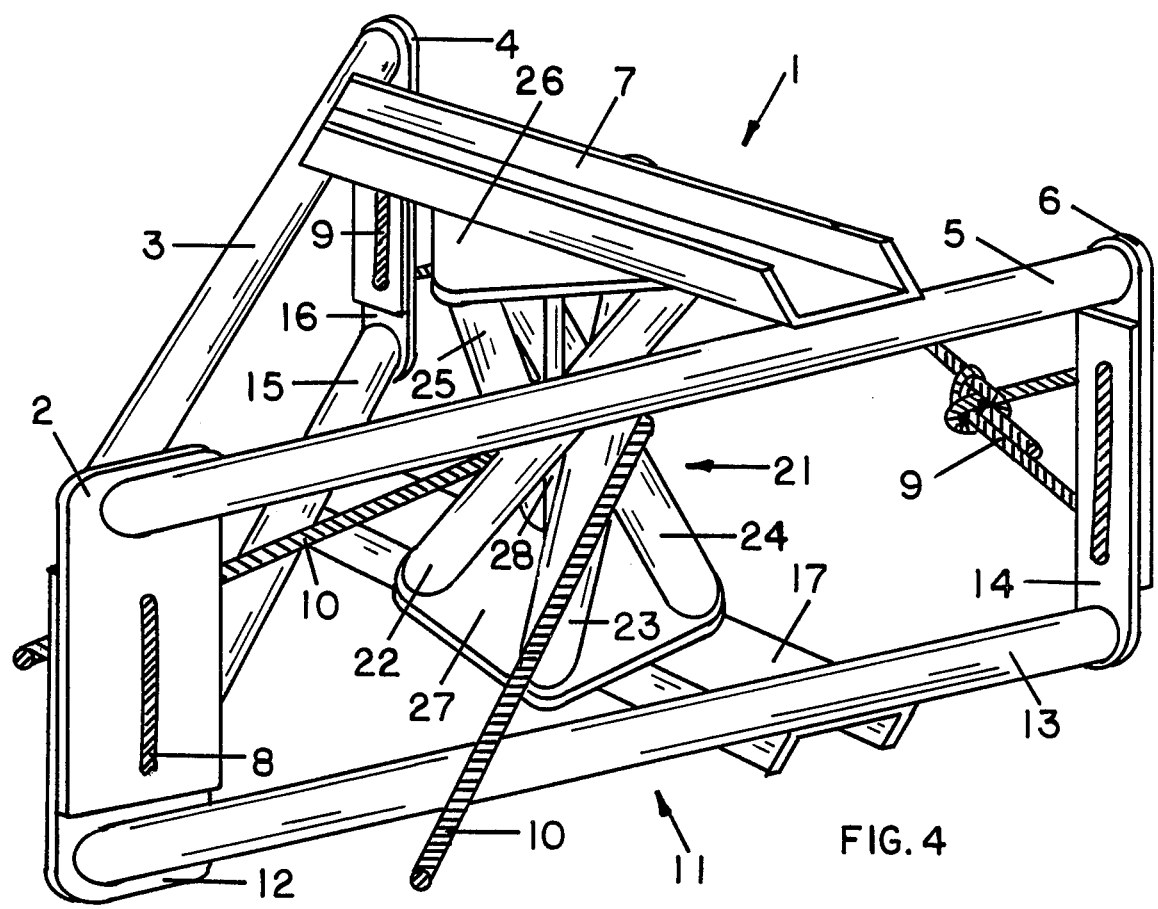
FIG. 4 is a perspective view illustrating the effect of combining the A-shaped frame with the square wheel.

FIG. 4 is a perspective view that illustrates the effect of combining the two A-shaped frame halves with the square wheel rotor.

When the top frame half 1 is rotated counter-clockwise in relation to the bottom frame half 11, the top vertical connectors 2, 4 and 6 separate from the bottom vertical connectors 12, 16 and 14. When the frame halves are separated from each other, the midsection of a pulling rope or chain 10 can be inserted into or removed from the pulley. Clockwise rotation of the top frame half 1 brings together and aligns the top vertical connectors 2, 4 and 6 with their respective bottom vertical connectors 12, 16 and 14. The front vertical connectors 2 and 12 are fastened together with a rope 8. The vertical connectors 4 and 16 on the left and the vertical connectors 6 and 14 on the right are secured by the two ends of rope 9 that is also used to encircle a tree, connect with an anchor, or be attached to any stationary object.

From the viewpoint of a pulling rope or chain, the A-shaped frame halves 1 and 11 horizontally and vertically surround both ends of the square wheel rotor 21.

The pulling rope 10 is shown in its operating position around the rotor 21. When the pulley is in use, the A-shaped frame guides the pulling rope 10 toward the front vertical connectors 2 and 12 and causes the force that is exerted on the pulling rope to point the pulley horizontally and vertically toward the midpoint between the pulling force and the object being pulled.

The angles formed by rotor support members 22, 23, 24 and 25 keep the pulling rope 10 away from the frame halves 1 and 11 and toward the central part of the rotor 21 while the pulling rope 10 moves toward the vertical connectors 2 and 12 due to the A-shaped frame. When an obstacle on the rope 10 comes in contact with the square wheel rotor 21, the obstruction moves toward the space between the rotor support members 22, 23, 24 or 25 and thereby forces the rotor 21 to rotate.

An alternate method of fastening the pairs of frame vertical connectors is to insert bolts or other common fasteners through the holes in each pair of connectors. Each user of the pulley can select the most advantageous method of securing the two frame halves together.

Figure 5:
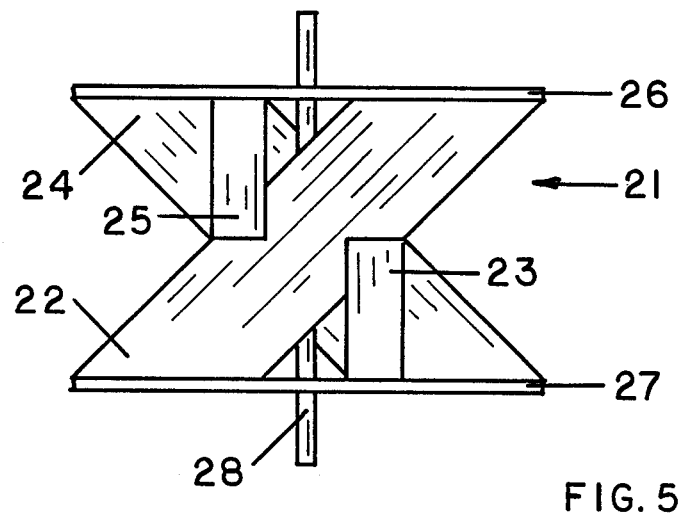
FIG. 5 is a front view of an alternate square wheel that is appropriate for wooden construction.

FIG. 5 shows the front view of an alternate square wheel rotor that is appropriate for wooden construction. The rotor support members 22, 23, 24 and 25 interlock with each other so that each member provides structural support to its adjacent members. All adjoining parts are connected together to form one rotor 21.

This invention expands the basic capabilities of a force reversing pulley that can be advantageously employed in a wide range of applications. The object being pulled to or from a remote site may provide transportation therein, the object may by its movements perform productive work, or the object may collect other materials as it travels to a central collection point. An application may require one or more A-framed square wheel pulleys to be used in combination with each other, incorporating all or only part of this invention in any one of the pulleys.

Embodiments of the invention may be used in areas where other access to or from a remote site are impractical due to speed of the desired operation or the characteristics of the space between the pulling force and the object being moved, such as in water that is filled with aquatic weeds or on land across a rain soaked farmer's field or through the air between canyon walls.

The foregoing specifications and descriptions are intended to illustrate the invention and shall not be construed as limiting the ways in which this invention may be practiced.

I claim:

1. An A-shaped pulley frame comprising:
  (a) two similar frame halves;
  (b) each of said frame halves comprising two tubular members having two ends;
  (c) one said end of each member joined with a vertical connector;
  (d) crossbar attached intermediate between the two ends of each said tubular members and on a tangent of each said tubular members to form an A-shape;
  (e) said crossbar provided with an opening for the reception of a rotor axle and axle bushing;
  (f) additional vertical connectors joined to the other end of each of said tubular members;
  (g) said vertical connectors from each frame half are provided with holes for joining together the said vertical connectors with fastening means whereby the two frame halves can be separated by releasing the fastening means and rotating one half in relationship with the other half for inserting or removing a rope or chain from the pulley.

2. A square wheel rotor comprising:
  (a) two square endplates joined with an axle defining an axis that passes through a centrally located hole in each said endplate, said endplates rotationally offset from each other about said axis;
  (b) four support members, each said member connecting one corner of one endplate to a diametrically opposed corner of the other endplate, at an angle from zero to seventy degrees to said axis, so that each member provides support to its adjacent members.

3. A force reversing pulley comprising
  (A) an A-shaped frame comprising:
    (a) two similar frame halves;
    (b) each of said frame halves comprising two tubular members having two ends;
    (c) one said end of each member joined with a vertical connector;
    (d) crossbar attached intermediate between the two ends of each said tubular members and on a tangent of each said tubular members to form an A-shape;
    (e) said crossbar provided with an opening for the reception of a rotor axle and axle bushing;
    (f) additional vertical connectors joined to the other end of each of said tubular members;
    (g) said vertical connectors from each frame half are provided with holes for joining together the said vertical connectors with fastening means;

(B) a square wheel rotor comprising:
- (a) two square endplates joined with an axle defining an axis that passes through a centrally located hole in each said endplate, said endplates rotationally offset from each other about said axis;
- (b) four support members, each said member connecting one corner of one endplate to a diametrically opposed corner of the other endplate, at an angle from zero to seventy degrees to said axis, so that each member provides support to its adjacent members;

(C) wherein said axle is rotatably secured in said crossbar openings and wherein the frame halves can be separated by releasing fastening means and rotating one frame half in relationship with the other half for inserting or removing a rope or chain from the pulley.

* * * * *